United States Patent Office 3,773,718
Patented Nov. 20, 1973

1

3,773,718
METHOD FOR MAKING IMIDO-SUBSTITUTED
AROMATIC POLYMERS
Johann F. Klebe and Thomas J. Windish, Schenectady,
N.Y., assignors to General Electric Company
No Drawing. Original application July 1, 1969, Ser. No.
838,322, now abandoned. Divided and this application
Apr. 30, 1971, Ser. No. 139,209
Int. Cl. C08f 19/100; C08g 33/02
U.S. Cl. 260—47 ET                           10 Claims

ABSTRACT OF THE DISCLOSURE

A Friedel-Crafts' alkylation method is provided for introducing imido-alkylene substitution, such as maleimidomethylene-substitution, into a variety of organic polymers having chemically-combined aromatic carbocyclic organic radicals, either in the polymer backbone such as polyarylenesulfones, polyaryleneoxides, polyarylenecarbonates, polyarylene esters, polyphenylene, etc., or as pendant radicals along the polymer chain, such as polystyrene, poly (styrene-vinylic or, dienic copolymers or terpolymers) etc. Reaction is effected between an imido-methylene compound and an organic polymer having chemically-combined aromatic carbocyclic organic radicals in the presence of a Friedel-Crafts' catalyst, such as boron trifluoride. The imido-alkylene-substituted aromatic carbocyclic organic polymers can be employed in making molding compounds, laminates, varnishes, etc.

---

This application is a division of our copending application Ser. No. 838,322, filed July 1, 1969, now abandoned, entitled Method for Making Imido-Substituted Aromatic Polymers.

The present invention relates to a method for introducing imido-alkylene-substitution into a variety of aromatic carbocyclic organic polymers by a Friedel-Crafts' alkylation reaction.

Polyimides are generally recognized as valuable solvent-resistant and temperature-resistant high performance polymers. It also is known generally that the introduction of imido radicals into various organic polymers can enhance the solvent resistance and impart other benefits to such organic polymers. Numerous methods for making polyimides have been developed, as shown, for example, by Holub, U.S. Pats. 3,410,875, 3,435,002, etc., assigned to the same assignee as the present invention. In these patents, polyimides can be made by effecting reaction between aromatic dianhydrides and organic diamines to produce linear polyamide acid intercondensation products. The employment of such difunctional reactants can result in the production of a wide variety of useful polyamide acids and polyimides. The intercondensation method cannot be employed to introduce imido-functionality into a wide variety of commercially available aromatic organic polymer unless the aromatic organic polymer has chemically-combined anhydride radicals or amine radicals in the backbone or terminal position. Water also is formed as a result of the intercondensation, which can further complicate efforts to introduce imido-substitution. As a result, alternate routes are constantly being sought by the chemical industry for introducing imido-substitution into aromatic organic polymers to improve the properties of such materials.

2

The present invention is based on discovery that organic polymers having chemically-combined aromatic carbocyclic organic radicals, can be imido-substituted by effecting reaction in the presence of a Friedal-Crafts' catalyst between the organic polymer, and an imido-alkylene compound of the formula, (1)

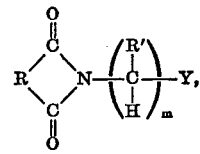

where R is a divalent organic radical selected from the class consisting of divalent hydrocarbon radicals and halogenated divalent hydrocarbon radicals, and R' is selected from hydrogen, monovalent hydrocarbon radicals, and halogenated monovalent hydrocarbon radicals, Y is a halogen or hydroxy radical, and "m" is an integer having a value of from 1 to 4 inclusive.

Radicals included by R, are, for example, arylene radicals, such as phenylene, biphenylene, naphthylene, anthrylene, etc., alkylene radicals, such as ethylene, trimethylene, tetramethylene, etc., halogenated arylene and alkylene radicals such as chlorophenylene, chloronaphthylene, chloroethylene, chlorotrimethylene, etc.; aliphatically unsaturated radicals such as

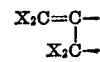

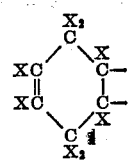

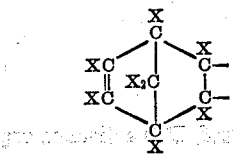

where X is a radical selected from hydrogen, lower alkyl, halogen, or mixtures thereof, such as chloro, methyl, ethyl, propyl, bromo, etc. Monovalent and hydrocarbon radicals included by R' are, for example, phenyl, chlorophenyl, methyl, ethyl, propyl, butyl, pentyl, hexyl, heptyl, octyl, etc.

There is provided by the present invention, a method which comprises (1) effecting contact between (A) an organic polymer and (B) an imido-alkylene compound of Formula 1, in the presence of an effective amount of (C) a Friedel-Crafts' alkylation catalyst, and (2) recovering from the mixture resulting from (1) organic polymer having at least one chemically-combined imido radical of the formula, (2)

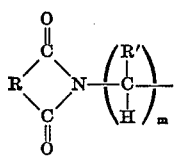

where (A) is an organic polymer selected from organic polymers having chemically-combined aromatic carbocyclic radicals in the polymer backbone of the formula, (3)

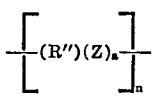

and organic polymers having chemically-combined pendant aromatic carbocyclic radicals of the formula, (4)

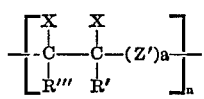

R'' is a polyvalent organo radical in the organic polymer backbone selected from (a) aromatic carbocyclic radicals selected from hydrocarbon radicals and halogenated hydrocarbon radicals,
(b) a mixture of polyvalent organo radicals selected from hydrocarbon radicals and halogenated hydrocarbon radicals containing from about 1 mole percent to 99.9 mole percent of (a) radicals, based on the total moles of such polyvalent organo radicals, R''' is a pendant monovalent organo radical selected from (c) aromatic carbocyclic radicals selected from hydrocarbon radicals and halogenated hydrocarbon radicals, and
(d) a mixture of monovalent organo radicals selected from hydrocarbon radicals and halogenated hydrocarbon radicals containing from about 1 mole percent to 99.9 mole percent of (c) radicals, based on the total moles of such monovalent organo radicals, Z is a polyvalent organo connective such as

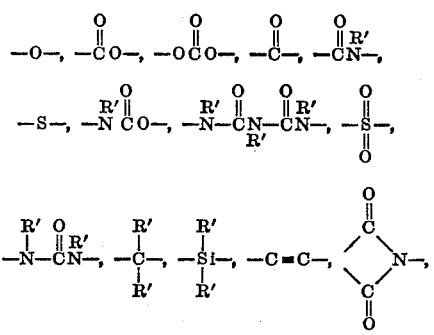

etc., and mixtures thereof, Z' is a divalent organo connective, such as

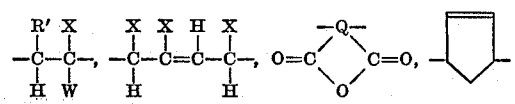

etc., and mixtures thereof, where R' and X are as previously defined, Q is polyvalent aliphatic radical derived from aliphatically unsaturated R radicals previously defined, W is a monovalent radical selected from hydrogen, alkyl radicals, for example, methyl, ethyl, propyl, etc., halogen radicals, aliphatic ester radicals, aromatic ester radicals, amido radicals, nitrile radicals and aliphatic nitrile radicals, "a" is a whole number equal to 0 or 1, and "n" is an integer having a value of from 1 to 1,000 inclusive, and preferably from 5 to 500 inclusive.

Radicals included by R'' of Formula 3 are phenylene, tolylene, xylylene, naphthylene, anthrylene, etc.; halogenated derivatives of such aromatic carbocyclic radicals, alkylated derivatives of such aromatic carbocyclic radicals; a mixture of such aromatic carbocyclic radicals, or derivatives of such aromatic carbocyclic radicals, and other polyvalent hydrocarbon radicals or halogenated polyvalent hydrocarbon radicals, which mixture contains at least about 1 percent and preferably about 10 mole percent to 99 mole percent of such aromatic carbocyclic radicals or derivatives thereof and up to 99 mole percent, and preferably up to about 90 mole percent of divalent radicals such as alkylene radicals, for example, methylene, ethylene, trimethylene, etc., halogenated derivatives thereof, etc.

Radicals included by R''' of Formula 4 are, for example, phenyl, tolyl, xylyl, naphthyl, anthryl, etc.; halogenated derivatives of such monovalent aromatic carbocyclic radicals; alkylated derivatives of such monovalent carbocyclic radicals; a mixture of such aromatic carbocyclic radicals, and other monovalent hydrocarbon radicals or halogenated hydrocarbon radicals, which mixture contains at least about 1 mole percent and preferably 10 mole percent to 99 mole percent of such aromatic carbocyclic radicals, or derivatives thereof, and up to about 99 mole percent and preferably up to 90 mole percent of monovalent radicals such as alkyl radicals, for example, methyl, ethyl, propyl, butyl, etc.; halogenated derivatives thereof, etc.

One method for making the imido-alkylene compounds included by Formula 1, is by effecting reaction at a temperature in the range of between about 50° C.–150° C. between the potassium salt of the imide precursor and an excess of the appropriate α,ω-dihalo or halo, hydroxy alkylene in the presence of a suitable organic solvent such as dimethyl sulfoxide.

Included by the imido-alkylene compounds of Formula 1, are alkylene and cycloalkylene imido-alkylene compounds, such as

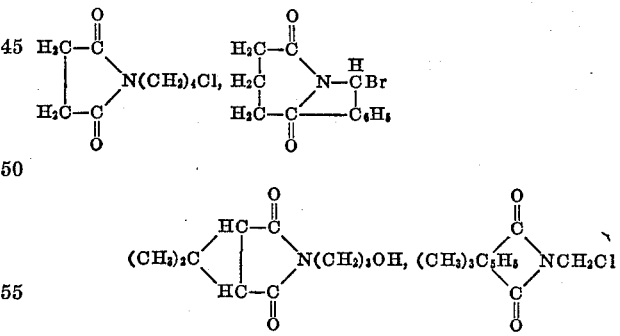

aromatic imido-alkylenehalides, for example,

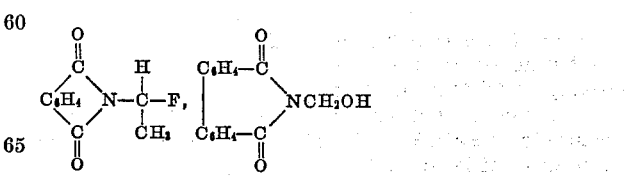

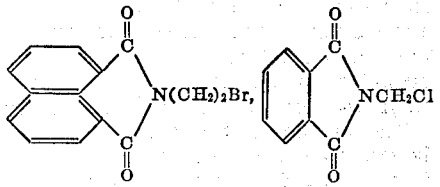

aliphatically unsaturated imido-alkylenehalides of the formula,

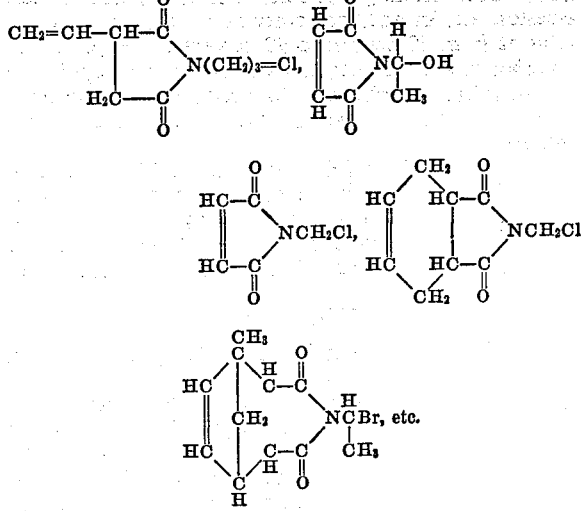

Among the aromatic organic polymers having chemically-combined units of Formula 3, there are included polyethers, polyesters, polycarbonates, polyamides, polyamideimides, polysulfones, polyurethanes, polyimides, polybiurets, polyxylylene, polyarylacetylenes, polyphenylenes, polysulfides, etc. Among the aromatic organic polymers, having chemically-combined units of Formula 4, there are included polystyrene, poly(α-methylstyrene), poly(methyl - α - methylstyrene), poly(dimethylstyrene), poly(chlorostyrene), poly(dichlorostyrene), styrene copolymers and terpolymers with butadiene, acrylonitrile, methylmethacrylate, vinylidenechloride, maleic anhydride, vinylchloride, vinylacetate, α-methylstyrene, etc.

The aromatic organic polymers which can be employed in the practice of the invention, also can include random, block, or graft copolymers containing at least 10 mole percent of units of Formula 3 or 4, chemically-combined with up to 90 mole percent, or less of units free of aromatic carbocyclic. For example, there can be employed in the practice of the invention polystyrene-polybutadiene graft copolymers, polydimethylsiloxanepolyphenylenecarbonate block copolymers, etc.

The Friedel-Crafts' catalysts which can be employed in the practice of the invention are well-known and include, for example, boron trifluoride, aluminum chloride, stannic chloride, ferric chloride, zinc chloride, concentrated sulfuric acid, toluene sulfonic acid, etc.

As shown in copending applications of Holub and Evans, Ser. No. 838,306, filed July 1, 1969, now Pat. 3,652,715, Serial No. 838,315, filed July 1, 1969, now abandoned, Serial No. 838,314, filed July 1, 1969, now Pat. 3,652,716, of Klebe and Windish, Ser. No. 846,623, filed July 1, 1969, now abandoned, and of Holub and Emerick, Ser. No. 838,316, filed July 1, 1969, now Pat. 3,652,710, filed concurrently herewith and assigned to the same assignee as the present invention, the method of the present invention can be employed to introduce imido-substituted radicals into a variety of aromatic carbocyclic polymers having chemically-combined units shown by Formulas 3 and 4, such as polyaryleneoxides, polyarylenecarbonates, polyaryleneamides, polyarylene esters, polystyrenes, etc.

In the practice of the method of the invention, contact is effected between the aromatic organic polymer and the imido-alkylene compound in the presence of a Friedel-Crafts' catalyst to introduce imido-alkylene-substitution into the aromatic organic polymer.

Temperatures which can be employed can vary over a range of from 0° C. to 200° C. and preferably from 20° C. to 150° C. The alkylation of the aromatic organic polymer can be effected in the presence of a suitable inert organic solvent. Any organic solvent can be employed which is inert to the reactants under the conditions of the reaction and which facilitates contact between the aromatic organic polymer and the imido-alkylene compound. Suitable organic solvents include, for example, methylene chloride, chloroform, tetrachloroethane, chlorobenzene, carbondisulfide, nitromethane, nitrobenzene and other solvents with electronegative substituents or mixtures of such solvents. Reaction can be effected between the imido-alkylene compound of the aromatic organic polymer in the presence of an effective amount of the Friedel-Crafts' catalyst which can be employed over wide ranges of concentration. An effective amount is that amount of catalyst which provides for the production of imido-substituted organic polymer at satisfactory yields. Experience has shown that effective results can be achieved if the catalyst concentration is employed at at least 1 mole percent, based on the total moles of imido-alkylene compound and chemically-combined aromatic organic units of Formula 3 or 4 in the reaction mixture preferably from about 5 mole percent to 100 mole percent. Higher or lower amounts can be utilized without adversely affecting the results desired but special techniques or procedures may be required.

Reaction times will vary depending upon such factors as the temperature employed, degree of agitation, the type of imido-alkylene compound employed, the nature of the aromatic organic polymer, as well as the degree of imido-substitution desired in the final product. A period of from 1 hour or less, to as many as 48 hours or more will, therefore, not be unusual and under most circumstances effective results can be achieved, in about 2 hours to provide for at least about 5 mole percent of imido-substitution, based on the total moles of chemically-combined aromatic organic units in the polymer.

Experience has shown that during the alkylation of the aromatic organic polymer, substantially anhydrous conditions should be maintained to provide for optimum results. However, up to 1,000 parts of water per million parts of mixture can be tolerated. Recovery of the final imido-methylene-substituted aromatic organic polymer can be achieved by the use of a low molecular weight aliphatic alcohol into which a mixture can be poured to provide the separation of the final product. The imido-alkylene-substituted aromatic polymer can then be recovered by filtration, followed by standard drying techniques.

The imido-alkylene-substituted aromatic organic polymer provided by the present invention can be employed in a variety of applications depending upon such factors as the type of aromatic organic polymer, the degree of imido-alkylene-substitution in the polymer, and whether the imido-alkylene radicals, as shown by Formula 1, are aliphatically unsaturated, or free of aliphatic unsaturation. For example, in instances where the aromatic organic polymer has chemically-combined imido-alkylene radicals of Formula 1, which is aliphatically unsaturated, these materials can be employed in a variety of applications such as molding compounds, varnishes, adhesives, laminating compounds, solvent-resistant coatings, dielectrics, insulating coatings, and several other applications normally requiring free radical and high energy electron curable materials convertible from the thermoplastic to thermoset state, as more particularly shown for particular aromatic organic polymers described in the aforementioned copending applications. In instances where the aromatic organic polymers are substituted with imido-alkylene radicals of Formula 1, which are free of aliphatic unsaturation, such aromatic organic polymers can provide for solvent-resistant coating compounds, molding resins, high temperature and oxidatively stable fibers and films, etc.

The imido-alkylene-substituted aromatic organic polymers of the present invention can be blended with various aliphatically unsaturated organic materials, such as aliphatically unsaturated organic monomers and certain aliphatically unsaturated organic polymers as well as organic polymers free of aliphatic unsaturation. Blends of the imido-alkylene-substituted aromatic organic polymers and the aforementioned organic monomers or polymers can be made over a wide proportion by weight. Experience has shown that there should be employed at least about 5 percent by weight of the imido-alkylene-substituted aromatic organic polymer to provide for cured products having improved characteristics. For example, if the imido-alkylene-aromatic organic polymer has chemically-combined aliphatically unsaturated imido-alkylene radicals in Formula 1, the blend of the imido-alkylene-substituted aromatic organic polymer with the aforementioned organic materials can be employed in making laminating compounds, solventless varnishes, molding compounds, coating compositions, etc., depending upon the proportions of the imido-aliphatically unsaturated imido-alkylene-substituted aromatic organic polymer and the organic polymer or monomer utilized in the blend. Those skilled in the art would know, for example, that as the proportion of the imido-alkylene aromatic organic polymer having aliphatically unsaturated imido-alkylene radicals increased with respect to either the organic monomer or polymer in the blend, particularly where the mole percent substitution of the aliphatically unsaturated imido-alkylene radical on the aromatic organic polymer exceeded 25 mole percent or more, the degree of crosslinking of the blend would be sufficiently high to make the resulting cured product an ideal solvent-resistant coating or insulating material.

Included by the aliphatically unsaturated monomers that can be employed in combination with the imido-alkylene-substituted aromatic organic polymers of the present invention are, for example, styrene, bismaleimide, N-phenylmaleimide, vinylchloride, isobutylene, butadiene, isoprene, chlorotrifluoroethylene, 2-methylpentene-1; vinyl esters of organic carboxylic acids such as vinylformate, vinylacetate, acrylonitrile, vinylmethyl, methyl, butyl, etc., esters of acrylic and methacrylic acids, etc.; divinylbenzene, triallylcyanurate, triallyltrimellitate, and N-vinylphthalimide, N-allylphthalimide, N-allyltetrachlorophthalimide, vinyl siloxanes, etc. Among the organic polymers that can be employed in combination with the imido-alkylene-substituted aromatic organic polymers of the present invention are, for example, polyvinylchloride, polyethylene, polypropylene, polysulfones, polystyrene, polyurethane, organopolysiloxanes, polyesters, polyphenyleneoxides, epoxides, etc.

Cure of the imido-alkylene-substituted aromatic organic polymer, or blend thereof with any of the aforementioned organic monomers or polymers, or combination thereof, can be effected thermally, or by the use of conventional free radical initiators. Temperatures of from 50° C. to 300° C. can be employed while 100° C. to 200° C. has sometimes been found to be more desirable. Acceleration of the cure of the imido-alkylene-substituted aromatic organic polymer, or blend thereof, can be achieved with organic peroxides, such as dicumylperoxide, benzoylperoxide, tertiary butylperbenzoate, tertiary alkylperoxycarbonate, azodicarbonamides, 2,5-dimethyl-2,5-bis(tertbuylperoxyhexane), etc. The peroxides can be employed from about 0.01 percent to about 5 percent by weight, based on the total weight of the blend. In addition, the imido-alkylene-susbtituted aromatic organic polymers or blends thereof, in addition to being curable by the aforementioned free radical initiators, can be cured with heat or radiation with high energy electrons, X-rays, ultraviolet lighting, etc., depending upon the crosslinked density of the resulting imido-substituted aromatic organic polymer or blend thereof, desired.

In addition to the aforementioned aliphatically unsaturated monomers and organic polymers which can be blended with the imido-alkylene-substituted aromatic organic polymers of the present invention, there can be employed, by weight, fillers in proportions of from 0 to 200 parts of filler per 100 parts of the imido-alkylene-substituted aromatic organic polymer. Included by the fillers which can be employed are, for example, clay, ground quartz, silica, sand, carbon black, glass fibers, glass beads, carbon fiber, asbestos, etc. In addition, other ingredients such as solvents at from 60 percent to 90 percent by weight of the resulting curable composition also can be employed such as N-methyl pyrrolidone, dimethylacetamide, toluene, methylenechloride, as well as plasticizers such as dioctylphthalate, etc.

In order that those skilled in the art will be better able to practice the invention, the following examples are given by way of illustration and not by way of limitation. In these examples, all parts are by weight and all reaction mixtures are stirred during the introduction of the Friedel-Crafts' catalyst.

EXAMPLE 1

N-chloromethylmaleimide was made by the following procedure:

A mixture of 9.8 parts of maleimide, 8.1 parts of a 37 percent formalin and 0.13 part of a 5.0 percent sodium hydroxide solution was stirred at room temperature. The maleimide dissolved rapidly and after about 5 minutes N-methylol maleimide began to precipitate. The product was filtered after 4 hours, dried and refluxed with 25 parts of thionylchloride for about 2 hours. Excess thionylchloride was distilled off and the residue purified by vacuum sublimation. There was obtained a crystalline product having a melting point of about 75° C.–76° C. Based on method of preparation and the aforementioned melting point, the product was N-chloromethylmaleimide.

A mixture was made of 2.5 parts of a poly-(2,6-diphenyl-1,4-phenyleneoxide) having an intrinsic viscosity of 0.82 in chloroform at 25° C., 0.375 part of N-chloromethylmaleimide, 35 parts of anhydrous tetrachloroethane, and 15 parts of anhydrous nitrobenzene. Boron trifluoride was passed into the solution over a period of 15 hours while it was stirred at a temperature of 55° C. A quantitative yield of product precipitated upon addition of methanol. Based on the method of preparation, the product was a maleimido-methyl-substituted polyphenyleneoxide having an average of about 300 chemically-combined phenylene oxide units, of which about 25 mole percent were substituted with maleimidomethyl radicals,

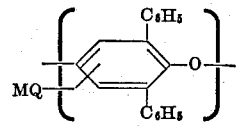

where M is a maleimido radical and Q is methylene, which were chemically-combined with about 75 mole percent of phenyleneoxide units of the formula,

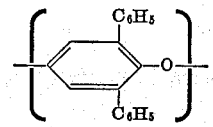

The identity of the product was confirmed by its elemental analysis.

A film of the imido-substituted polyphenyleneoxide is cast from a tetrachloroethane solution onto an aluminum substrate. The film is exposed to β-radiation to a dosage of 50 MR. It is found to be insoluble in several organic solvents including tetrachlorethane, and useful as an organic solvent resistant coating.

EXAMPLE 2

Mixtures of 5 parts of commercially-available polycarbonate prepared from 2,2-bis(4-hydroxyphenyl)propane having an intrinsic viscosity in dioxane at 25° C. of 0.50 and 0.72 part of the N-chloromethylmaleimide prepared in Example 1 were dissolved in 100 parts of an anhydrous mixture consisting of about 70 parts of tetrachloroethane and 30 parts of nitrobenzene. Boron trifluoride was introduced into the mixture while it was stirred at a rate of about one bubble per second over a period of about 50 hours, while the temperature was maintained at about 65° C. A quantitative yield of product was then recovered by precipitation with methanol. Based on the method of preparation and elemental analysis, the product was a polycarbonate having about 25 mole percent of

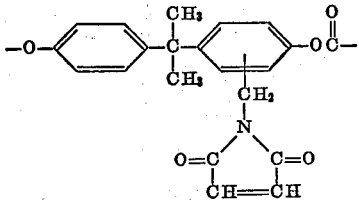

units, chemically-combined with about 75 mol percent of

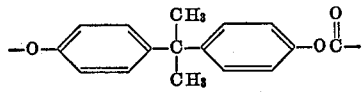

units.

Elemental analysis, wt. percent.—Theory: C, 73.4; H, 5.2; N, 1.25. Found: C, 72.6; H, 5.3; N, 1.2.

A molded bar of the above imido-substituted polycarbonate is heated at 200° C. for 30 minutes. It is found to be insoluble in several organic solvents including tetrachlorethane and benzene. The imido-substituted polycarbonate is useful in the manufacture of molded automotive parts which after heat curing have the desired solvent and oil resistance.

EXAMPLE 3

Boron trifluoride was passed into a solution at 55° C., while it was stirred consisting of 5 parts of a polystyrene having a molecular weight of 100,000, 1.83 parts of N-chloromethylmaleimide prepared in accordance with Example 1, 70 parts of anhydrous tetrachloroethane and 30 parts of anhydrous nitrobenzene. After 15 hours, a product was obtained by pouring the resulting mixture into methanol. Based on method of preparation and the infrared spectrum of the product which showed a strong carbonyl absorption at 1,720 cm.$^{-1}$, the product was identified as a maleimido-methylene-substituted polystyrene having about 25 mole percent of the phenyl radicals substituted with maleimido-methylene radicals based on the total moles of imido-substituted and unsubstituted phenyl radicals in the polystyrene. The identity of the polymer and the degree of substitution was further confirmed by elemental analysis. A thin film of the product containing about 1 percent of benzophenone was subjected to ultraviolet irradiation for 20 seconds. Those parts of the film that were exposed to the ultraviolet light were found to be insoluble in organic solvents. The product is useful as a photoresist.

EXAMPLE 4

Boron trifluoride was bubbled into a mixture of 5 parts of a polycarbonate of Example 2, 3 parts of N-chloromethyltetrahydrophthalimide, and about 100 parts of a 7:3 mixture, by weight, of anhydrous tetrachloroethane and nitrobenzene. The reaction mixture was maintained at a temperature of about 110° C. during the addition of the boron trifluoride which was introduced at a rate of about a bubble per second. During the reaction which lasted about 22 hours, the mixture was maintained substantially anhydrous. A product was precipitated from the mixture at the termination of the reaction by pouring the mixture into methanol. Based on the method of preparation and infrared spectrum, the product was a polycarbonate having about 15 mole percent of its 2,2-bis(4-hydroxyphenyl)propane radicals substituted with tetrahydrophthalimidomethylene radicals, based on the total moles of such imido-substituted radicals and unsubstituted 2,2-bis(4-hydroxyphenyl)propane radicals in the polycarbonate. The identity of the product was further confirmed by its elemental weight percent analysis. Theoretical: C, 73.7; H, 5.3; N, 0.75. Found: C, 74.7; H, 5.6; N, 0.75. The product is found to be curable by heat or by free radical initiation and can be employed to make craze resistant coatings on metallic and other substrates.

EXAMPLE 5

Boron trifluoride was bubbled into a mixture while it was stirred and maintained at 75° C. of 5 parts of the polycarbonate of Example 2, 3 parts of N-chloromethylphthalimide, 134 parts of methylenechloride and about 10 parts of nitrobenzene. Methylenechloride was allowed to distill from the mixture over a period of about 6 hours during the boron trifluoride addition. There was then added to the mixture about 50 parts of chloroform. The product was then precipitated by pouring the mixture into methanol. Based on method of preparation, the product was a phthalimido-methylene-substituted polycarbonate having about 50 mole percent of chemically-combined phthalimido-methylene-substituted 2,2 - bis(4 - hydroxyphenyl)propane radicals and based on the total moles of such phthalimido-methylene-substituted radicals and unsubstituted 2,2-bis(4-hydroxyphenyl)propane radicals in the polycarbonate. The identity of the product was further confirmed by its infrared spectrum, showing strong carbonyl absorption at 1,715 cm.$^{-1}$, and the elemental analysis, C, 74.6%; H, 5.3%; N, 1.5%. The phthalimido-methyl-substituted polycarbonte shows improved solvent characteristics and craze resistance as compared to the same polycarbonate free of phthalimido-methylene substitution.

EXAMPLE 6

Boron trifluoride was slowly bubbled into a solution of 5 parts of a poly(2,6-dimethylphenyleneoxide) having a molecular weight of about 50,000 and 1 part of N-chloromethylmaleimide and a mixture of about 70 parts of anhydrous tetrachloroethane and 30 parts of anhydrous nitrobenzene at a temperature of about 70° C. over a period of 7 hours. The mixture was then poured into methanol to effect the precipitation of product. Based on method of preparation, the product was a poly(2,6-dimethylphenyleneoxide) having about 11 mole percent of chemically-combined phenyleneoxide units substituted with maleimido-methylene radicals based on the total moles of phenyleneoxide units in the polymer. The identity of the product was further confirmed by its infrared spectrum showing strong carbonyl absorption at 1,720 cm.$^{-1}$. Elemental weight percent analysis also confirmed the identity of the product for approximately 11 mole percent maleimidomethylene substitution. Theoretical: C, 77.4%; N, 1.05%. Found: C, 77.6%, N, 1.2%. The polymer is useful as a protective coating in acid etching of metal surfaces, where a pattern can be imposed upon the surface by crosslinking part of the coating by ultraviolet light and exposing part of the metal surface by dissolving the shaded areas of the coating.

EXAMPLE 7

Boron trifluoride was slowly bubbled into a solution of 5 parts of polystyrene having a molecular weight of about 100,000 and 2.65 parts of N-chloromethyl-3,6-methano-2,2,3,6-tetrahydrophthalimide and 70 parts of tetrachloroethane and 30 parts of nitrobenzene while the temperature is maintained at 55° C. over a period of about 12 hours. The imido-methylene alkylating agent was made from 3,6 - methano - 2,2,3,6 - endomethylenetetrahydrophthalicanhydride employing thionylchloride in accordance with the method of Example 1. The mixture was then poured into methanol to effect the precipitation of the product. Based on method of preparation, the product was a polystyrene having chemically-combined 3,6-methano - 2,2,3,6 - tetrahydrophthalimidomethylene radicals. The identity of the product was confirmed by its infrared spectrum.

EXAMPLE 8

A mixture of 44.7 parts of tetrahydrophthalimide, 24 parts of 37 percent formalin and about 1 part of a 5 percent sodium hydroxide solution was stirred for 3 hours at 25° C. The N-hydroxymethyltetrahydrophthalimide was isolated by recrystallizing the solid product from benzene, filtering, and allowing the product to dry. A mixture of 43.4 parts of N-hydroxymethyltetrahydrophthalimide and 150 parts of thionylchloride was refluxed for 2 hours. N-chloromethyltetrahydrophthalimide was recovered from the mixture by stripping excess thionylchloride under vacuum followed by recrystallizing the resulting product from petroleum ether.

Boron trifluoride was slowly bubbled into a mixture of 5 parts of a poly-(2,6-diphenyl-1,4-phenyleneoxide) having an intrinsic viscosity of 0.82 in chlorofrom at 25° C., 4.02 parts of N-chloromethylphthalimide, 70 parts of anhydrous tetrachloroethane and 30 parts of anhydrous nitrobenzene. Prior to the addition of the boron trifluoride, the aforementioned mixture had been saturated with boron trifluoride. The mixture was stirred at 25° C. for about 60 hours. The mixture was then poured into methanol to effect the precipitation of product. Based on method of preparation, the product was a poly-(2,6-diphenyl-1,4-phenyleneoxide) having about 78 mole percent of its aromatic carbocyclic radicals substituted with phthalimido-methylene radicals. The identity of the prodduct was confirmed by elemental analysis having a nitrogen content of about 2.83 percent by weight which corresponds to a polyphenylene oxide with 78 percent of the repeating units substituted with phthalimidomethyl groups. The polymer is useful as a molding resin with excellent high temperature oxidative stability.

EXAMPLE 9

A mixture of 10 parts of the poly-(2,6-diphenyl-1,4-phenyleneoxide) of Example 9, 8.03 parts of N-chloromethylphthalimide, 140 parts of anhydrous tetrachloroethane and 60 parts of nitrobenzene was stirred while 6.28 parts of anhydrous aluminum chloride was slowly added. The mixture was stirred for 16 hours at 55° C. The mixture was then put into methanol to effect the precipitation of the product. Based on the method of preparation, the product was a phthalimido-methylene-substituted poly-(2,6-diphenyl-1,4-phenyleneoxide). The identity of the product was confirmed by its infrared spectrum showing strong carbonyl absorption at 1,720 cm.$^{-1}$.

EXAMPLE 10

Boron trifluoride was slowly introduced into a mixture of 5 parts of polystyrene and 4.9 parts of N-chloromethylphthalimide and 70 parts of anhydrous tetrachloroethane and 30 parts of anhydrous nitrobenzene over a period of 16 hours while the mixture was stirred and maintained at a temperature of 55° C. The mixture was then poured into methanol to effect a precipitation of product which was filtered and dried. Based on the method of preparation, the product was a polystyrene having chemically-combined phthalimido-methylene radicals. The identity of the product was confirmed by the characteristic carbonyl absorbance at 1,715 cm.$^{-1}$ in its infrared spectrum. The polymer is useful as a molding composition with increased softening temperature as compared with unsubstituted polystyrene.

EXAMPLE 11

Boron trifluoride is slowly introduced into a 10 percent solution of styrene-butadiene copolymer and N-chloromethylmaleimide in chlorobenzene. The styrenebutadiene copolymer is prepared in accordance with the method of Amos et al. Pat. 2,694,692 utilizing a mixture of 90 mole percent of butadiene and 10 mole percent of styrene. The N-chloromethylmaleimide is present in the mixture at about an equal molar amount of the styrene utilized in making the copolymer. The solution is stirred while the boron trifluoride is introduced over a period of about 15 hours at 25° C. The mixture is then poured into methanol and a product is precipitated. Based on the method of preparation, the product is a styrene-butadiene copolymer having chemically-combined styryl radicals substituted with maleimidomethylene radicals.

A solution of the maleimido-methylene substituted copolymer in chlorobenzene is poured onto an aluminum substrate and the solvent is allowed to evaporate at a temperature below its boiling point. The resulting film containing about 2 percent by weight of benzophenone is irradiated with ultraviolet light for a period of about 2 minutes. The film is found to be insoluble in chlorobenzene and exhibits valuable dielectric and insulating properties.

EXAMPLE 12

A tetrachloroethane solution was refluxed for about 5 hours consisting of 5 parts of a poly(2,6-diphenylphenyleneoxide) having a molecular weight of about 50,000, 2.7 parts of N-methylolmaleimide, 1.3 parts of anhydrous p-toluenesulfonic acid and 100 parts of solvent. During the reflux period, about ½ of the solvent along with water of reaction was distilled off. The resulting mixture was then diluted with 100 parts of chloroform and poured into methanol. A quantitative yield of product was obtained which was identified as a maleimidomethyl substituted poly(2,6-diphenylphenyleneoxide) which was substantially the same product as obtained in Example 1.

EXAMPLE 13

Boron trifluoride is slowly introduced into an anhydrous tetrachloroethane solution which is mechanically stirred at a temperature of between 80–120° C. under a nitrogen atmosphere, consisting of 1 part of N-chloromethylmaleimide, 5 parts of a polyester prepared from a mixture of ethyleneglycol, isophthaloylchloride and adipyl chloride having about 10 mole percent of isophthaloyl units, 40 mole percent of adipyl units and 50 mole percent of ethyleneglycol units based on the total moles of the various units in the polyester. After 12 hours, the mixture is poured into methanol contained in a Waring Blender. A polymeric product is recovered in quantitative yield. Based on method of preparation, the product is a polyester having about 10 mole percent of units of the formula,

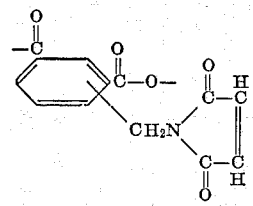

chemically combined with —CH$_2$CH$_2$O—, and

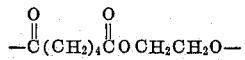

units. The identity of the product is further confirmed by its infrared spectrum.

A film is cast from a 10 percent solution in tetrachloroethane of a composition consisting of 98 parts of the above polymer and 2 parts of dicumylperoxide. The film is heated at a temperature of 150° C. for 1 hour and 200° C. for 1 hour. There is obtained a rigid solvent resistant film which can be employed as a wire coating enamel, or as a dielectric.

EXAMPLE 14

N-(2-chloroethyl)tetrahydrophthalimide was made by the following procedure:

A mixture of 10 parts of N-(2-hydroxyethyl)tetrahydrophthalimide, which had been prepared from tetrahydrophthalic anhydride and ethanolamine by standard procedure, was refluxed with 25 parts of thionylchloride for about 2 hours. Excess thionylchloride was distilled off and the residue purified by recrystallization from methanol. There was obtained a crystalline product having a melting point of about 85° C. Based on method of preparation and the aforementioned melting point, the product was N-(2-chloroethyl)tetrahydrophthalimide.

A polyarylene ether having a molecular weight of about 10,000 and consisting essentially of chemically combined units of the formula,

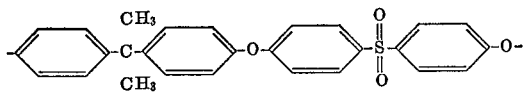

is prepared in accordance with the teaching of A. S. Hay, Advances in Polymer Science, Vol. 4, pages 496–527 (1967). A solution consisting of 1 part of the above polyarylene ether, 1 part of N-(2-chloroethyl)tetrahydrophthalimide and 0.5 part of anhydrous aluminum chloride in 20 parts of a 7:3 mixture of tetrachloroethane and nitrobenzene is heated at about 100° under anhydrous conditions for 15 hours. A product is recovered by precipitation with methanol. Based on method of preparation, the product is a tetrahydrophthalimidoethyl-substituted polyarylene sulfone ether. Its identity is confirmed by infra-red analysis showing carbonyl absorption at about 1,700 cm.$^{-1}$.

A film is cast from a 10 percent solution of the imido-substituted polyarylene sulfone ether in tetrachloroethane. Upon exposure to a 50 MR dose of β-radiation, the film is found to be substantially swell resistant in a variety of organic solvents.

Although the above examples are limited to only a few of the very many variables within the scope of the present invention, it should be understood that the present invention is directed to a method of making a much broader class of imido-substituted aromatic carbocyclic organic polymers by employing a compound of Formula 1 with organic polymer of Formulas 3 and 4 in the presence of an effective amount of a Friedel-Crafts' catalyst.

We claim:
1. A method for making a molding compound or a solvent resistant coating compound which comprises
   (1) effecting contact between a resinous aromatic carbocyclic organic polymer consisting essentially of chemically combined units of the formula,

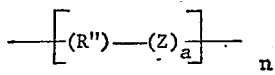

and an imido-alkylene compound of the formula,

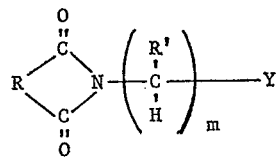

in the presence of an effective amount of a Friedel-Crafts' alkylation catalyst, and
   (2) recovering from the mixture of (1) aromatic carbocyclic organic polymer having at least 11 mole percent of aromatic carbocyclic radicals having directly attached to a carbocyclic ring carbon atom at least one imido-alkylene radical of the formula,

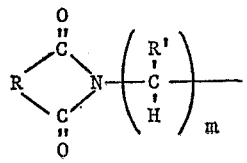

where R is a divalent organic radical selected from the group consisting of hydrocarbon radicals and halogenated hydrocarbon radicals, R' is selected from the group consisting of hydrogen, monovalent hydrocarbon radicals and halogenated monovalent hydrocarbon radicals, R'' is a polyvalent aromatic carbocyclic radical, Z is a divalent organo radical selected from the group consisting of

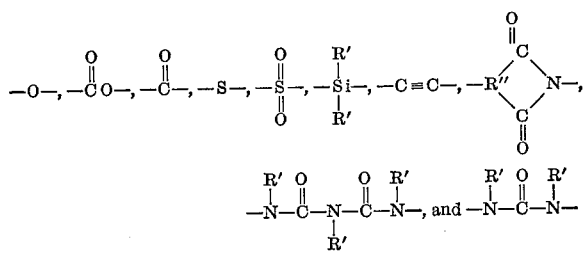

Y is a halogen or hydroxy radical, $m$ is an integer having a value of from 1–4 inclusive, $a$ is a whole number equal to from 0 to 1 and $n$ is an integer having a value of from 5 to 500 inclusive.

2. A method in accordance with claim 1, where the organic polymer is a polyaryleneoxide.
3. A method in accordance with claim 1, where the organic polymer is a polyarylenecarbonate.
4. A method in accordance with claim 1, where the organic polymer is a polyarylene ester.
5. A method in accordance with claim 1, where the organic polymer is a polyarylenesulfone.
6. A method in accordance with claim 1, where the imido-methylene compound is a maleimido-methylene compound.
7. A method in accordance with claim 1, where the imido-methylene compound is a phthalimido-methylene compound.
8. A method in accordance with claim 1, where the Friedel-Crafts' alkylation catalyst is boron trifluoride.
9. A method in accordance with claim 1, where the organic polymer is poly(2,6-dimethylphenyleneoxide).
10. A method in accordance with claim 1, where the organic polymer is a polyarylene ether having chemically-combined units of the formula,

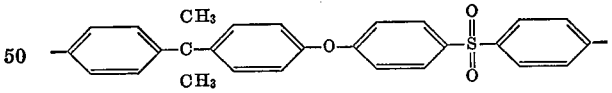

References Cited

Chemical Abstracts, vol. 54, 1960, p. 24473g, Gornostaeva et al.
Chemical Abstracts, vol. 68, 1968, p. 869442, Rabusic et al.
Journal of Organic Chemistry, vol. 26, 1961, pp. 15–21, Tawney et al.
Tetrahedron Letters, No. 50, 1968, pp. 5267–9, Sisido et al.

HAROLD D. ANDERSON, Primary Examiner

U.S. Cl. X.R.

117—161 UN, 161 VA; 204—159.14, 159.22; 260—30.2, 31.8 R, 32.6 N, 33.6 R, 33.8 R, 41 R, 47 XA, 47 CZ, 47 UA, 49, 78 UA, 78.5 R, 85.1, 85.5 AM, 86.1, N, 93.5 R, 824, 874, 880, 897, 899